United States Patent
Flanagan et al.

(10) Patent No.: US 12,293,525 B2
(45) Date of Patent: May 6, 2025

(54) ARTIFICIAL INTELLIGENCE ENABLED METROLOGY

(71) Applicant: FEI Company, Hillsboro, OR (US)

(72) Inventors: John Flanagan, Hillsboro, OR (US); Brad Larson, Portland, OR (US); Thomas Miller, Portland, OR (US)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 17/965,217

(22) Filed: Oct. 13, 2022

(65) Prior Publication Data

US 2023/0034667 A1 Feb. 2, 2023

Related U.S. Application Data (63) Continuation of application No. 16/175,013, filed on Oct. 30, 2018, now abandoned.

(51) Int. Cl.
*G06T 7/12* (2017.01)
*G06F 18/243* (2023.01)
(Continued)

(52) U.S. Cl.
CPC .............. *G06T 7/12* (2017.01); *G06F 18/243* (2023.01); *G06N 3/045* (2023.01); *G06N 3/08* (2013.01); *G06N 20/20* (2019.01); *G06T 7/0004* (2013.01); *G06T 7/10* (2017.01); *G06T 7/11* (2017.01); *G06T 7/13* (2017.01); *G06T 7/174* (2017.01); *G06T 7/30* (2017.01); *G06V 10/267* (2022.01); *G06V 10/44* (2022.01); *G06V 10/764* (2022.01); *G06V 10/82* (2022.01);
(Continued)

(58) Field of Classification Search
CPC ... G06T 7/10–13; G06T 7/174; G06T 7/0004; G06T 7/0006; G06T 7/001; G06T 2207/30148; G06T 2207/20081; G06T 2207/20084; G06T 2207/10056; G06T 2207/10061; G06N 3/02–0985; G06N 20/20; G06V 10/82; G06V 10/764; G06V 10/267; G06V 10/44; G06V 10/462; G06V 10/22; G06V 10/225; G06V 10/23; G06V 10/25; G06V 10/26; G06F 18/243
See application file for complete search history.

(56) References Cited

U.S. PATENT DOCUMENTS 9,530,199 B1 12/2016 Weinberg et al.
9,576,772 B1 2/2017 Arjavac et al.
(Continued)

OTHER PUBLICATIONS

Harley, Adam W., Konstantinos G. Derpanis, and Iasonas Kokkinos. "Segmentation-Aware Convolutional Networks Using Local Attention Masks." arXiv preprint arXiv:1708.04607v1 (2017). (Year: 2017).*

(Continued)

*Primary Examiner* — Geoffrey E Summers
(74) *Attorney, Agent, or Firm* — Michael Best & Friedrich LLP (57) ABSTRACT

Methods and systems for implementing artificial intelligence enabled metrology are disclosed. An example method includes segmenting a first image of structure into one or more classes to form an at least partially segmented image, associating at least one class of the at least partially segmented image with a second image, and performing metrology on the second image based on the association with at least one class of the at least partially segmented image.

15 Claims, 6 Drawing Sheets

(51) Int. Cl.

| | | |
|---|---|---|
| *G06N 3/045* | (2023.01) | |
| *G06N 3/08* | (2023.01) | |
| *G06N 20/20* | (2019.01) | |
| *G06T 7/00* | (2017.01) | |
| *G06T 7/10* | (2017.01) | |
| *G06T 7/11* | (2017.01) | |
| *G06T 7/13* | (2017.01) | |
| *G06T 7/174* | (2017.01) | |
| *G06T 7/30* | (2017.01) | |
| *G06V 10/26* | (2022.01) | |
| *G06V 10/44* | (2022.01) | |
| *G06V 10/764* | (2022.01) | |
| *G06V 10/82* | (2022.01) | |

(52) U.S. Cl.
CPC .............. *G06T 2207/10056* (2013.01); *G06T 2207/10061* (2013.01); *G06T 2207/20084* (2013.01); *G06T 2207/30148* (2013.01)

(56) References Cited

U.S. PATENT DOCUMENTS

| 10,733,744 | B2 | 8/2020 | Ha et al. |
|---|---|---|---|
| 2011/0296362 | A1 | 12/2011 | Ishikawa et al. |
| 2016/0275672 | A1 | 9/2016 | Bhattacharyya et al. |
| 2016/0349742 | A1 | 12/2016 | Dalla-torre et al. |
| 2016/0350905 | A1 | 12/2016 | Dalla-torre et al. |
| 2017/0177997 | A1* | 6/2017 | Karlinsky ............ G06V 10/993 |
| 2018/0268098 | A1* | 9/2018 | Katzir ........................ G03F 1/84 |
| 2018/0293721 | A1* | 10/2018 | Gupta .................... G06N 3/045 |
| 2019/0080445 | A1 | 3/2019 | Onishi et al. |

OTHER PUBLICATIONS

Lakcher, Amine, et al. "SEM contour based metrology for microlens process studies in CMOS image sensor technologies." Optical Microlithography XXXI. vol. 10587. SPIE, 2018. (Year: 2018).*

Eddins, Steve. "Feret Diameter: Introduction," Steve on Image Processing with MATLAB, MathWorks, Sep. 29, 2017. <https://blogs.mathworks.com/steve/2017/09/29/feret-diameter-introduction/>. (Year: 2017).*

Toyoda, Yasutaka, et al. "SEM-contour shape analysis method for advanced semiconductor devices." Metrology, Inspection, and Process Control for Microlithography XXVII. vol. 8681. SPIE, 2013. (Year: 2013).*

Huang Q., et al., "Object Boundary Guided Semantic Segmentation," Asian Conference on Computer Vision, Springer, 2016, pp. 197-212.

* cited by examiner

ARTIFICIAL INTELLIGENCE ENABLED METROLOGY

This application is a Continuation of U.S. application Ser. No. 16/175,013 filed Oct. 30, 2018, which is hereby incorporated by reference.

FIELD OF THE INVENTION

The invention relates generally to artificial intelligence (AI) enabled metrology, and specifically to AI enabled metrology for use in charged particle microscopy.

BACKGROUND OF THE INVENTION

In many areas of industry and research, analysis and measurement of small structures is performed for product/process development, quality control, medical evaluation, etc. Such analysis and measurement may be performed using various types of inspection tools, which likely include forming images of one or more structures of interest. For example, in the semiconductor industry, charged particle microscopes are used to image circuit structures on the nanometer scale, which typically become the basis for the analysis and measurement tasks. In such an example, measurements are performed on the images themselves to understand potential for defects and process control. Such analysis and measurements, however, require a highly skilled operator to determine where to measure and key features for use in performing the measurements. This may typically be done using the creation of a recipe that can be ran once the key features are identified and located.

This identification and location of the key features by the skilled operator, however, can be tedious and void of robustness. Additionally, small changes in imaging conditions or manufacturing processes may require manually re-tuning the recipes due to the inability of the recipe to locate the key features on its own. Such requirement to continually re-work the recipe due to changes in the imaging and/or the manufacturing makes full automation unreliable and/or unreachable. In many instances, the operators are required to screen out false positives to ensure the accuracy of the analysis. Removal of the constant human interaction with the process is desirable in all industries to increase productivity and reduce costs. Additionally, a desire for more robust automatic analysis and measurement of structures, especially small structures that experience changes in shape and consistency, is desired.

SUMMARY

Methods and systems for implementing artificial intelligence enabled metrology are disclosed. An example method includes segmenting a first image of structure into one or more classes to form an at least partially segmented image, associating at least one class of the at least partially segmented image with a second image, and performing metrology on the second image based on the association with at least one class of the at least partially segmented image.

Another embodiment includes a charged particle microscope system for performing metrology on obtained images. The system including an imaging platform to obtain an one or more images of a part of a sample, each of the one or more images including structure. A controller coupled to the imaging platform to at least perform metrology on the structure in at least one of the images, the controller, coupled to or including non-transitory, computer readable medium including code, that when executed by one or more cores, causes the controller to segment a first image of the one or more the images of structure into one or more classes to form a segmented image, associate at least one class of the segmented image on with the second image of the one or more images of the structure; and perform metrology on the second image of the structure based on the association of at least one class of the segmented image.

BRIEF DESCRIPTION OF THE DRAWINGS

Like reference numerals refer to corresponding parts throughout the several views of the drawings.

DETAILED DESCRIPTION OF EMBODIMENTS

Embodiments of the present invention relate to AI enhanced metrology. In some examples, the AI aspect assists placement of metrology-based analytical tools on an original image. For example, an input image may be segmented into one or more classes to determine the location of reference features, which are then located on the input image and used as key features as references for metrology processes. However, it should be understood that the methods described herein are generally applicable to a wide range of different AI enhanced metrology, and should not be considered limiting.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Additionally, in the following discussion and in the claims, the terms "including" and "comprising" are used in an open-ended fashion, and thus should be interpreted to mean "including, but not limited to . . . ." The term "integrated circuit" refers to a set of electronic components and their interconnections (internal electrical circuit elements, collectively) that are patterned on the surface of a microchip. The term "semiconductor device" refers generically to an integrated circuit (IC), which may be integral to a semiconductor wafer, separated from a wafer, or packaged for use on a circuit board. The term "FIB" or "focused ion beam" is used herein to refer to any collimated ion beam, including a beam focused by ion optics and shaped ion beams.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In general, metrology on images, e.g., using images for a basis of measurement, obtained with a charged particle microscope, for example, has conventionally required heavy user interaction to obtain quality data. The heavy user interaction may be required due to image contrast making edge finding difficult for standard image processing algorithms, and due to deformed structures in the images making structural recognition difficult for the image processing algorithms, to provide a few examples. While metrology is a required aspect of process control and defect detection in certain industries, such as the microelectronics industry, improvements in image recognition and metrology are greatly desired irrespective of the industry. It should be noted that while the discussion herein uses the microelectronics industry to illustrate the disclosed techniques, the use of the microelectronics industry is not limiting and the disclosed techniques may be implemented on images of any kind for any measurement purposes without exceeding the bounds of the disclosure, and all current and future uses are contemplated herein.

One solution to the above disclosed problem includes neural network image processing to segment images and label some or all pixels of the image with one or more class designations. The class designation may be used to determine regions or points of interest, e.g., desired features for use in metrology (either measured or for anchoring measurement points), of a structure in the original image. Once the region/points of interest are segmented, analytical tools, such as active contours, pattern recognition, and boundary location analytics, e.g., edge finders, may be placed on the image based on the segmentation, for example, which may then be used to perform metrology or perform the metrology on the structures in the original image. Because the segmentation into one or more classes is performed by the neural network, recognition of deformed structures is more easily tolerated and identified than would be by conventional image processing, to provide one example of improvement.

Figure 1:
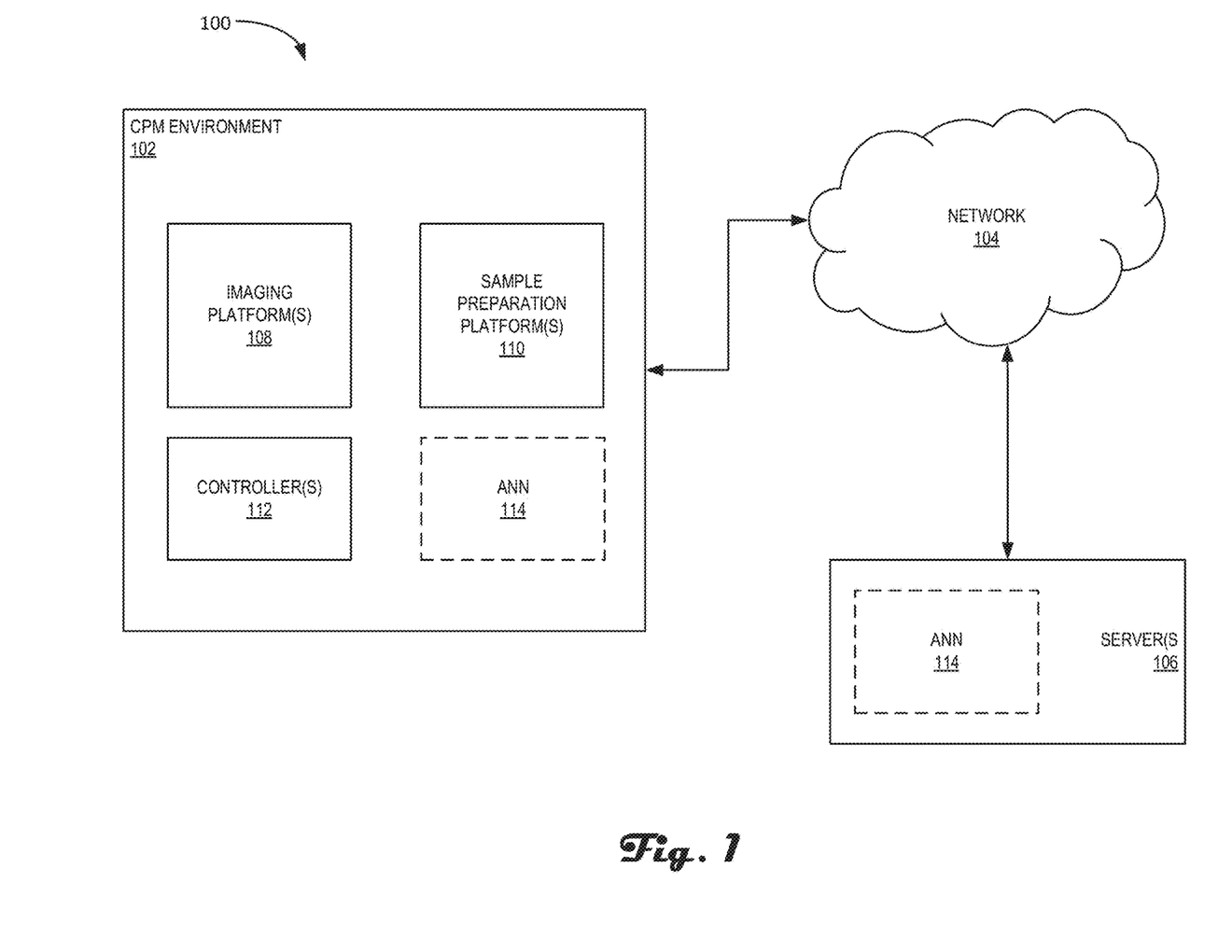
FIG. 1 is an example of a charged particle microscope system in accordance with an embodiment of the present disclosure.

FIG. 1 is an example of a charged particle microscope system 100 in accordance with an embodiment of the present disclosure. The charged particle microscope (CPM) system 100, or simply system 100, at least includes a CPM environment 102, a network 104, one or more servers 106, and an artificial neural network 114. The CPM system 100 may be used to investigate and analyze samples of various size and makeup. For one example, the CPM system 100 may be implemented, at least partially, at an integrated circuit manufacturing site and used to analyze and measure various aspects of wafers and circuits fabricated at the site. In some embodiments, the CPM system 100 may be distributed across various locations. For example, the CPM environment 102 may be located at a fabrication or development location, the network 104 distributed locally, regionally, or nationally, and the server 106 located at a server farm and coupled to the CPM environment 100 via the network 104. Regardless of the organization of the CPM system 100, the system 100 may at least be used to implement one or more artificial neural networks (ANN) 114 along with one or more analytical algorithms to perform various metrology-directed tasks.

The CPM environment 102 includes any type of charged particle microscope, but the application of the neural network and analytics disclosed herein is not limited to charged particle microscopy, which is used for illustrative purposes only. Example CPMs include scanning electron microscopes (SEMs), transmission electron microscopes (TEMs), scanning transmission electron microscopes (STEMs), focused ion beams (FIBs), and dual beam (DB) systems that include both electron and ion beam capabilities, to name a few. The CPM environment 102 may be used to obtain electron or ion images of samples, some of which may be thin sections, e.g., lamellae, taken from a larger sample or wafer. The CPM environment 102 may include various aspects that can be contained in a single tool or that may be situated in separate tools. For example, the CPM environment 102 may include an imaging platform 108, e.g., an SEM, TEM, or STEM, a sample preparation platform 110, and one or more controllers 112. Of course, each platform 108 and 110 may include more than one microscope/sample preparation tools as well.

The imaging platform 108 is used to obtain images of samples, some of the samples may have been prepared by the sample prep platform 110, but that is not necessary. The images are obtained using an electron and/or ion source to irradiate the sample with a respective beam of charged particles. In some examples, the charged particle beam imaging is obtained by a scanned beam, e.g., moved across the sample, while other examples the charged particle beam is not scanned. Backscattered, secondary, or transmitted electrons, for example, are then detected and gray scale images formed based thereon. The images include gray scale contrast depending on the materials of the sample, where the changes in gray scale indicate changes in the material type or crystal orientation. The imaging platform 108 may be controlled by internal controls (not shown), controller 112, or a combination thereof.

The sample prep platform 110 forms some of the samples that are imaged by the imaging platform 108. Of course, imaged samples may also be formed by other tools (not shown). The sample prep 110 may, for example, be a DB system that uses a FIB to prepare and assist in the removal of a thin sample from a larger sample, such as by ion milling, ion induced etching, or a combination thereof, and other processes to process the sample for imaging. Other processes may include, but are not limited to, planarizing mills/etches, fiducial generation, cross-section formation, top-down lamella preparation, etc. The sample prep platform 110 may also include an electron imaging component that allows the sample prep process to be monitored, but the electron imaging component is not required. In some embodiments, the sample prep platform 110 may include other physical preparation aspects—lasers, cutting tools, resin encapsulation tools, cryogenic tools, etc.—that are used to prepare the sample for the imaging platform 108. The sample prep platform 110 may be controlled by internal controls (not shown), controller 112, or a combination thereof.

The network 104 may be any kind of network for transmitting signals between the CPM environment 102 and the server(s) 106. For example, the network 104 may be a local area network, a large area network, or a distributive network, such as the internet, a telephony backbone, and combinations thereof.

The servers 106 may include one or more computing platforms, virtual and/or physical, that can run code for various algorithms, neural networks, and analytical suites. While not shown, a user of the CPM environment 102 may have access to the servers 106 for retrieval of data, updating software code, performing analytical tasks on data, etc., where the access is through the network 104 from the user's local computing environment (not shown). In some embodiments, the user accesses image data stored on the servers 106, implements segmentation using the ANN 114 (which may be executed on the servers 106 or the CPM Environment 102), and performs metrology at their local computing environment.

In operation, one or more images of a sample is obtained by the imaging platform 108. At least one of the images, which includes one or more structures of interest for example, may be segmented into one or more classes by ANN 114. The ANN 114 may be included with CPM environment 102, servers 106, or a combination thereof. The segmented image may then be used to locate/identify desired features of each, or at least one, of the imaged structures in the one or more acquired images. The desired features may be located/identified using various techniques, such as overlaying the segmented image on one of the original images, associating pixels of the desired features in the segmented image with corresponding pixels in one of the original images, mapping pixels of the segmented image onto pixels of like structure on one of the original images, to name a few examples. Of course, any technique to provide correspondence between pixels/features in the segmented image with the same of the original image is contemplated herein. The located features may then be used as reference points, e.g., boundaries of the structure, apexes of the structure, etc., for metrology purposes. The located reference points, which may also be referred to herein as key points, may then be used to facilitate placement of analytical tools, such as boundary locating analytics and active contours for example, which may then be used for performing metrology on the one or more structures of the image. For example, boundary locating analytics, such as an edge finder algorithm, may be placed on the image based on the location of the reference points, which then determines boundaries between different materials/features of the structure. The located boundaries are then used to guide metrology of at least a portion of the structure. See FIG. 5 for an example, which will be discussed in detail below.

In some embodiments, the segmented image, or pixels thereof, is associated with the image that was segmented. In other embodiments, the segmented image is associated with one of the other acquired images as long as the other acquired image is registered with the image used as a basis for the segmentation. For example, a bright field (BF) image and a high-angle angular dark field (HAADF) image are acquired simultaneously, where the two images are characterized as being "perfectly registered," and one of the images, such as the BF image, may be segmented and used to identify key reference points, which may then be associated with corresponding points on the HAADF image for metrology purposes. Or, vice versa. To provide another example, two consecutive images of the same sample area may be quickly acquired, and one of the two images used for segmentation and the other image used for metrology.

While the image provided to the ANN 114 is described as being obtained by imaging platform 108, in other embodiments, the image may be provided by a different imaging platform and provided to the ANN 114 via the network 104.

In one or more embodiments, the ANN 114, which may also be referred to as a deep learning system, is a machine-learning computing system. The ANN 114 includes a collection of connected units or nodes, which are called artificial neurons. Each connection transmits a signal from one artificial neuron to another. Artificial neurons may be aggregated into layers. Different layers may perform different kinds of transformations on their inputs.

One type of ANN 114 is a convolutional neural network (CNN). A CNN is conventionally designed to process data that come in the form of multiple arrays, such as a color image composed of three two-dimensional arrays containing pixel intensities in three color channels. Example architecture of a CNN is structured as a series of stages. The first few stages may be composed of two types of layers: convolutional layers and pooling layers. A convolutional layer applies a convolution operation to the input, passing the result to the next layer. The convolution emulates the response of an individual neuron to visual stimuli. A pooling layer combines the outputs of neuron clusters at one layer into a single neuron in the next layer. For example, max pooling uses the maximum value from each of a cluster of neurons at the prior layer.

In one or more embodiments, the ANN 114 is a CNN configured to detect and/or identify, e.g., classify, objects of interest shown in an input image of a sample. An object of interest is a portion of the sample that is under study. The remaining portions of the specimen provide context for the object of interest. However, the object of interest needs to be measured while the remaining portions of the specimen may be ignored. As an example, one or more round or oval structures may be objects of interest within an image, and the one or more oval components may be measured. Of course, the objects of interest disclosed herein are for illustrative purposes only, and any type of object of interest captured by a CPM system 100 may be classified by the ANN 114.

Prior to use, the ANN 114 may need to be trained to identify desired features of structure in an image. Stated another way, the ANN 114 needs to learn how to segment images as desired. The training may typically include providing the ANN 114 a number of annotated images with the annotations highlighting desired/different components of the structure. For example, boundaries and key reference points may be highlighted. The training images may typically include images of various quality and also include structure of various conformity with desired shape. Based on the training images, the ANN 114 learns how to identify the various classes of any image received regardless of image/structure quality. Further, the amount of training images may be based on the complexity of the structures being analyzed, with less complexity requiring fewer training images.

FIGS. 2A through 2D show example CNNs 214 for segmenting images in accordance with embodiments of the present disclosure. The CNNs 214 are non-limiting examples of the ANN 114, and may be implemented in a CPM system, such as system 100. In the disclosed embodiments of FIGS. 2A through 2D, one or more CNNs may receive an input, such as an image, and provide a segmented image as an output. In the embodiments, the CNNs 214 segment the input image into one or more classes to provide an output image segmented accordingly. It is understood that one or more classes refer to one or more non-background classes. In the following discussions one class, or at least one class, refers to a non-background class. The simplest classifier is a binary classifier with at least two classes: background, and the object of interest. The one or more classes may include body of structure, edges of structure, reference points, and combinations thereof. Of course, fewer or more classes may be used to segment the input image, and the number of classes implemented may depend on the complexity of the segmentation along with other considerations. The one or more classes may be used to determine boundaries of a structure in the images, where the boundaries are used for references in performing metrology of the structure.

In some embodiments, the segmentation of the image results in every pixel of the image being associated with at least one class, such as a body of structure class, an edges of structure class, and a reference points class. In other embodiments, not all pixels may be associated, but instead only pixels of the structure itself may be classified. For example, pixels of the image associated with a edge of the structure or a reference point may be identified by the CNN, which may then be used for metrology anchoring. Associating only identified pixels of the image with a class may result in a partially segmented image, at least in terms of representing the segmented image. Of course, other combinations of classifications may also be implemented.

Figure 2A:
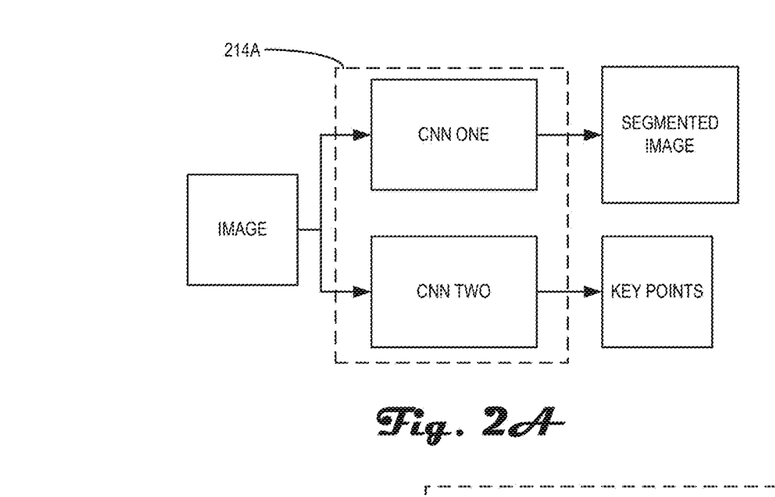
FIGS. 2A through 2D show example CNNs for segmenting images in accordance with embodiments of the present disclosure.

FIG. 2A shows CNN 214A, which includes two CNNs, CNN ONE and CNN TWO, with each CNN segmenting the input image differently. For example, CNN ONE receives the input image and provides a segmented image with the segmentation directed at one or more classes of the structure. On the other hand, CNN TWO receives the input image and segments for a single, specific class, such as the key points class, and provides an output image including the key points class associated with one or more pixels of the input image. The two output images of CNN 214A may be mapped to or overlaid on the original input image to define the pixels of the original image with the different classes. In some embodiments, however, only the key points image may be overlaid on the original image, where the key points will be used as designations where metrology of desired features of the structure should be anchored/referenced.

Figure 2B:
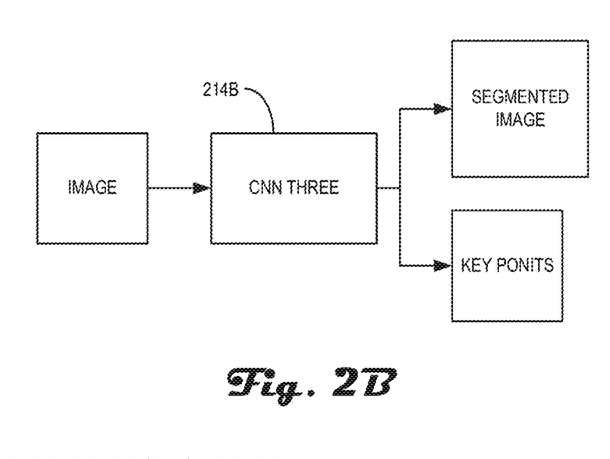

FIG. 2B shows an example CNN 214B, which is a single CNN THREE. The CNN 214B segments the image into multiple classes and designates each pixel of the image as one or more classes, and provides multiple images as outputs. For example, one output may be a segmented image that includes all classes except for the key points, whereas a second output may include only the image with the key points classified. Either of both output images may then be mapped to or overlaid on the input image to designate pixels associated with the anchor/reference points of the structure.

Figure 2C:
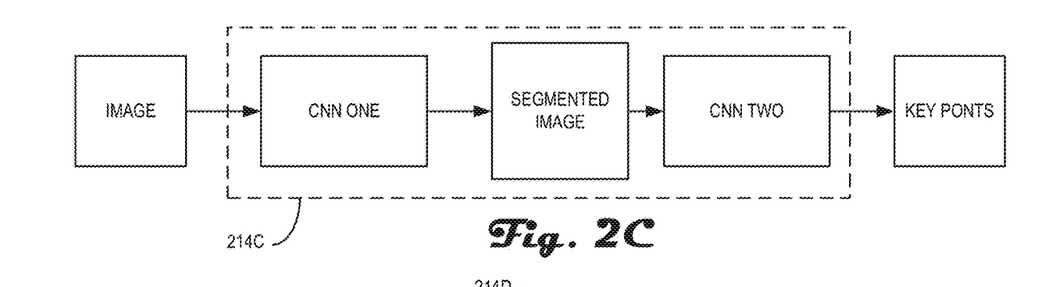

FIG. 2C shows an example CNN 214C, which includes CNN ONE and CNN TWO. CNN 214C is similar to CNN 214A except for the order of application. Instead of applying CNN ONE and TWO to an image in parallel similar to CNN 214A, CNN 214C applies CNN ONE and TWO in series. For example, CNN ONE may segment the image into one or more classes of structure, while CNN TWO segments the image into the key points class. While the output image is shown to only include the key points, the CNN 214C may provide an output image that includes all classes.

Figure 2D:
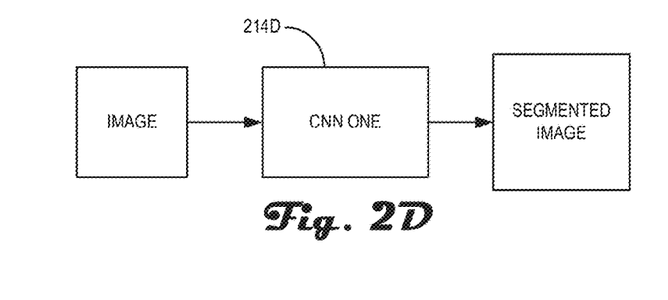

FIG. 2D shows an example CNN 214D that includes CNN ONE. CNN 214D segments an input image into one or more classes and provides an output image in response. The output image of CNN 214D may include all classes of the CNN 214, or a subset of the classes. For example, CNN 214D may provide a segmented image that includes only a single non-background class, such as a boundary class or structure class, that may then be used as references for metrology purposes.

Figure 3:
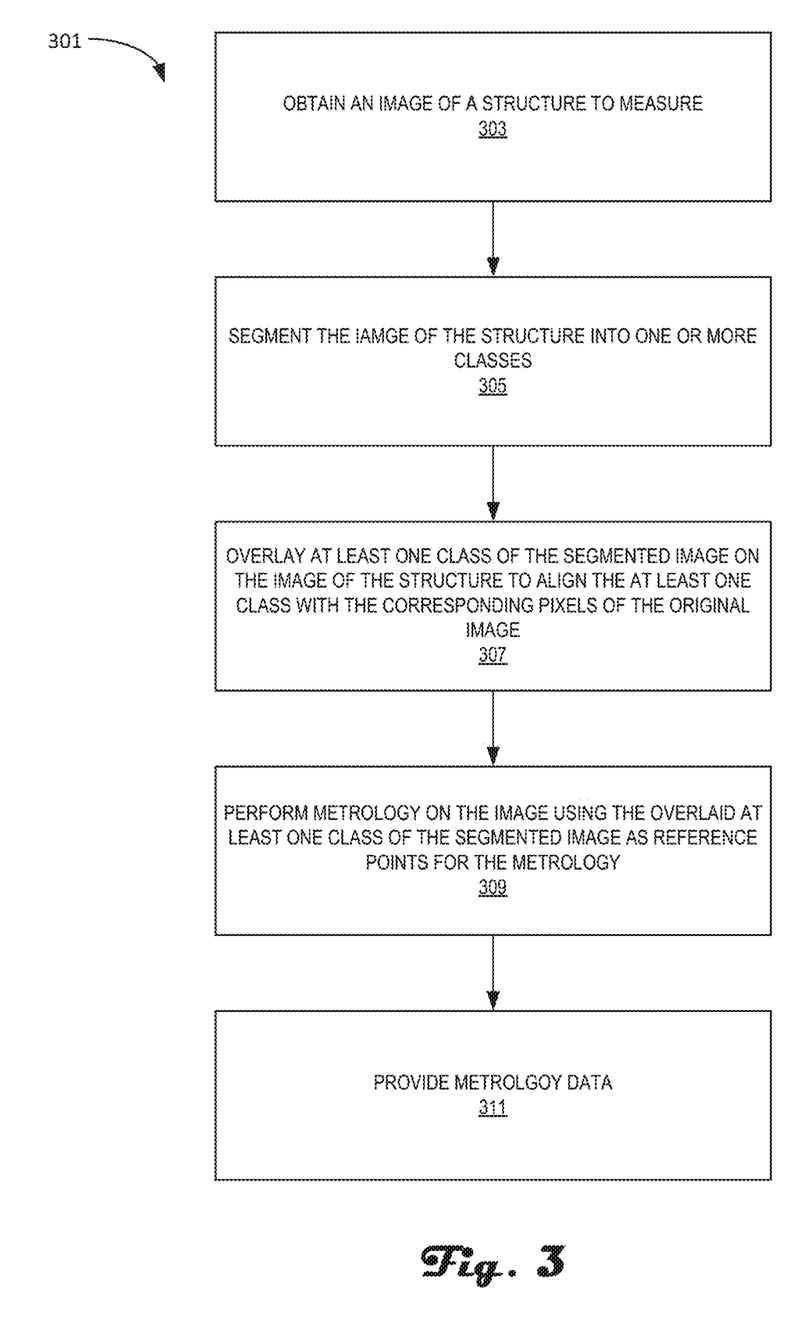
FIG. 3 an example method for segmenting an image and performing metrology using the segmentation to set reference points for metrology purposes in accordance with an embodiment of the present disclosure.

FIG. 3 is an example method 301 for segmenting an image and performing metrology using the segmented image to identify reference points for metrology purposes in accordance with an embodiment of the present disclosure. The method 301 may be performed by a CPM system, such as system 100 for example. Of course, the method may also be performed by a computing system that is not part of a CPM system, but receives images obtained by a CPM system for processing by the method 301. In general, the method 301 may receive or obtain an input image that includes one or more features, e.g., a TEM image, and provides metrology data of at least part of one or more of the features in the image or in a registered image in response.

The method 301 may begin at block 303, which includes obtaining an image of a structure to measure. The image may be obtained by a CPM system, such as an image platform 108. For example, the image may be a TEM image of features, e.g., structure, of an integrated circuit. See FIG. 5A for example. The TEM image may be of a lamella extracted from a semiconductor wafer that includes the features of the integrated circuit. Of course, other methods may also be used to obtain the image, which also may be of other types of samples, e.g. biological, mineral, crystalline, etc. In some embodiments, the obtained image may be a single image of the sample, whereas in other embodiments, the image may be one of multiple registered images of the sample.

Block 303 may be followed by block 305, which includes segmenting the image of the structure into one or more classes. The segmentation may be performed by an artificial neural network, such as ANN 114 or CNN 214A-D. The image may be segmented into classes to associate pixels of the input image with one or more classes, such as body, boundary, key points, etc., and the number of classes is not limiting. See FIG. 5B for example.

Block 305 may be followed by block 307, which includes overlaying at least one class of the segmented image on the image of the structure to align the at least one class with the corresponding pixels of the image. For example, pixels of the key points class may be overlaid on the original image to locate features used for anchoring measurements performed on the structure in the image. See FIG. 5C for example. In some embodiments, the key points class may locate and designate bounds or features of the structure where measurements may be anchored, e.g., started or ended. In some embodiments, the pixels of the key points class may be used to designate pixels in the original image to for anchoring metrology. The designation may be performed by mapping, overlaying or associating the pixels identified as key class to the corresponding pixels in the original image. As such, the segmented image may not need to be overlaid, either actually or virtually, on the original image, but the segmented image is used to identify the pixels in the original image that serve a good reference anchor point for purposes of metrology.

In some embodiments, as noted above, the at least one class of the segmented image may be overlaid on a separate image that is registered to the original input image. As such, the association of the segmented image, or pixels of a desired class of the segmentation, does not need to strictly be made with the image used for the segmentation. As long as there is registration between two images, then the image used for segmentation need not be the same image used for metrology. As such, the term "original image" as used herein does not specifically require the image used for segmentation but also includes separate, registered images of the image used for segmentation.

Block 307 may be followed by block 309, which includes performing metrology on the original image using the overlaid at least one class of the segmented image. The metrology may begin by determining a boundary of the structure to base the measurements, such as by performing one or more boundary locating algorithms on the original image using the at least one class, e.g., key points, as indicating areas where to perform the edge finding algorithms. See FIG. 5D, 5E for example. The boundary locating algorithms in general use various analytical tools to determine the location of a boundary, such as active contours, image recognition, and edge finders, to name a few. For example, an edge finder algorithm may perform a search using grey scale difference or contrast differences of pixels within an area around the key point associated pixel to determine a boundary of a feature of interest. The gray scale difference may be performed in some embodiments by taking the derivative of the gray scale change. In some embodiments, the boundary may be formed between two different materials, a metal and an insulator for example. The edge finders may determine the location of key features of the original image using the key features class as an initial guide. Locating the key features may allow further measurements to be made of the object of interest.

Block 309 may be followed by block 311, which includes providing metrology data. The metrology data may include measurements of one or more areas of the structure, which may be used for process control or design validation, to name a couple examples.

In some embodiments, the segmentation of the image along with overlaying the segmented image, or at least a portion of it, on the original image may make the edge finding and metrology more amendable to automation. Additionally, the use of the key points class, for example, may assist the edge finding algorithms to locate boundaries when the features of interest are malformed or when the imaging has experienced problems. Without the segmentation process, a skilled user may have to go through every image and locate where the boundaries may be before applying the edge finding algorithm, which is inefficient.

Figure 4:
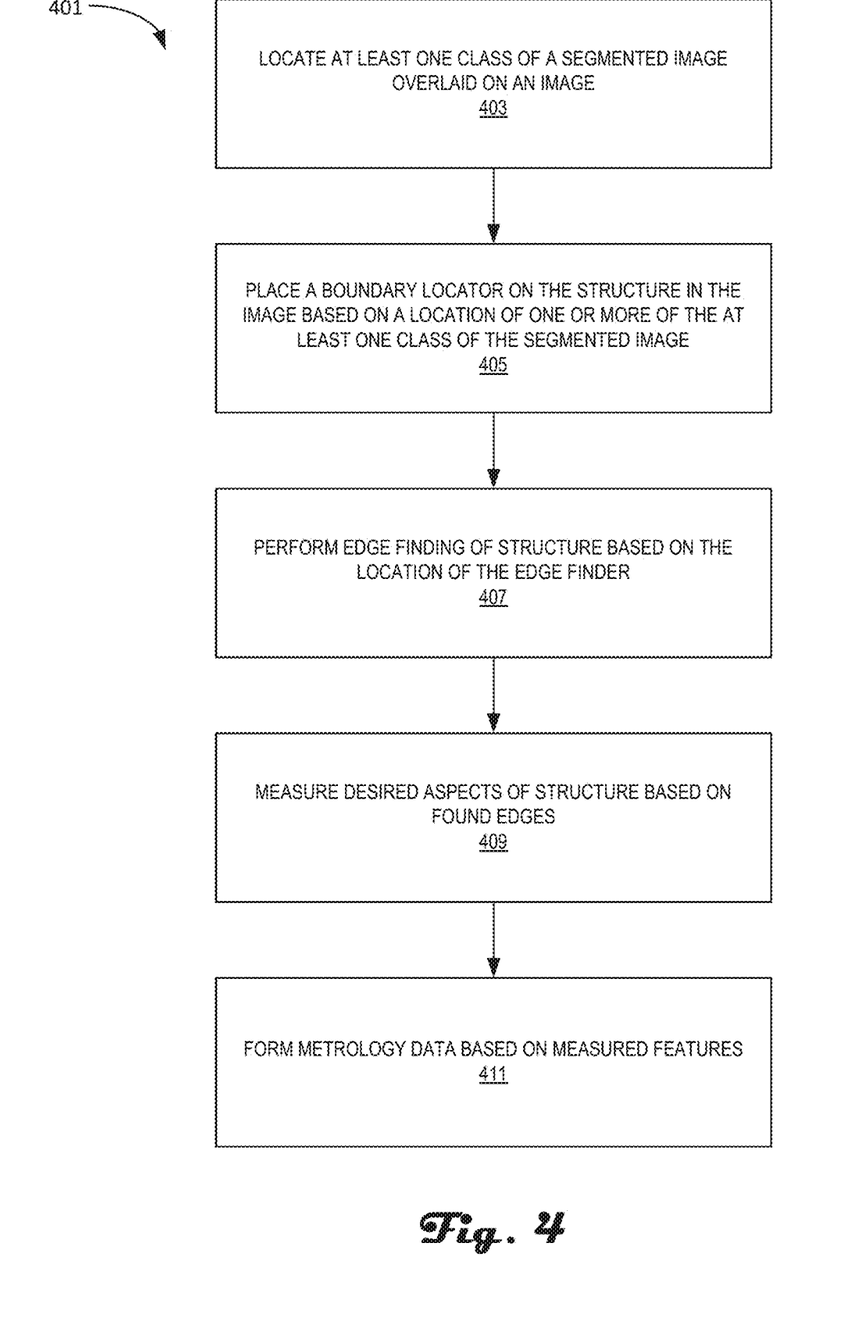
FIG. 4 is an example method 401 of performing metrology on an image in accordance with an embodiment of the present disclosure.

FIG. 4 is an example method 401 of performing metrology on an image in accordance with an embodiment of the present disclosure. The method 401 may be performed by a CPM system, such as system 100 for example. Of course, the method may also be performed by a computing system that is not part of a CPM system, but receives images obtained by a CPM system for processing by the method 401. The method 401 may begin at block 403, which includes locating at least one class of a segmented image that has been overlaid on, mapped to, or associated with an original image. In general, the segmented image is used to identify pixels in the original image that can be used as anchor or reference points for purposes of performing metrology. The original image may have been obtained by a CPM system, such as system 100, and the segmented image may have been obtained by a neural network, such as ANN 114 and/or CNN 214A-214D. At least some of the pixels of the segmented image may have been assigned one or more classes by the neural network to determine parts of the image corresponding to the one or more classes. The image, for example, may be a TEM image of circuit structure, which is to be measured. In some embodiments, the at least one class may be a key points class that identifies key features of the structure, which may provide anchor points for metrology purposes.

Block 403 may be followed by block 405, which includes placing a boundary locating algorithm, such as an edge finder, on the structure in the image based on a location of one or more of the at least one class of the segmented image. While an edge finder is used as a specific example of an analytical tool to determine boundaries, other tools may also be implemented, such as active contours or image recognition algorithms, and the analytical tool is a non-limiting aspect of the present disclosure. The at least one class, the key points for example, may designate which pixels of the original image are indicative of boundaries of the structure to be measured. Block 405 may be followed by block 407, which includes performing edge finding of the structure in the original image based on the location of the edge finder. The edge finder may begin with forming a virtual area centered on the key points class, then analyzing the pixels in the virtual area to determine the edge of the structure. This determination, while aided by the segmented image, is performed separately on the original image to ensure accuracy of the metrology. In some embodiments, a contrast comparison is performed on the pixels in the virtual area to determine where the structure boundary is located.

Block 407 may be followed by block 409, which includes measuring desired aspects of the structure based on the found edges, e.g., boundaries. For example, a width of the structure at the location of the key points may be determined from the image. This process may be performed for multiple areas/segments of the structure to provide metrology data on the structure—either the entire structure or portions thereof—as show in block 411.

FIGS. 5A through 5E show a sequence of example images in accordance with an embodiment of the present disclosure. The sequence shows an example of a segmented image, overlaying, mapping or associating one class of the segmented image to pixels of the original image, and placement of edge finders based on the identified pixels, which may then be used as the basis for performing metrology.

Figure 5A:
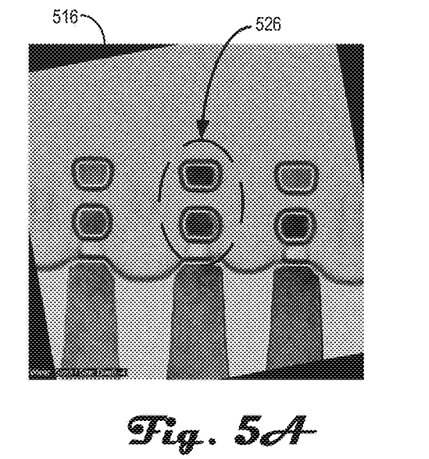
FIGS. 5A through 5E show a sequence of example images in accordance with an embodiment of the present disclosure.

FIG. 5A is an example input image 516 in accordance with an embodiment of the present disclosure. The input image 516 may have been obtained with a TEM and is an image of a lamella including a cross-section of components of an integrated circuit. The input image 516 includes a plurality of structures 526 where each structure 526 includes two oval-ish shaped spots surrounded by a dark ring, which is surrounded by a lighter colored material/region. The oval-ish shaped spots may be of a first material, the dark ring a second material and the surrounding lighter colored area a different material. While the materials may be determined using various analytical techniques, EDX for example, knowledge of the materials is unnecessary for the techniques disclosed herein. It should also be noted that in some embodiments, the input image itself may be an EDX-generated image, or an electron energy loss spectrum (EELS) image, but the type of image is not limiting. The measurements of various features of each structure 526 may be desired. For example, the height and width of the oval-ish shaped spots may be desired. In other embodiments, the height and width of the columns below the spots may also be desired. To determine these measurements, e.g., to perform metrology on the structures, the input image 516 may be provided to one or more neural networks, such as ANN 114 and/or CNNs 214A-D, for segmentation. As discussed above, the segmented image may be overlaid on, mapped to, or associated with the input image for placement of analytical functions, such as edge finders.

Figure 5B:
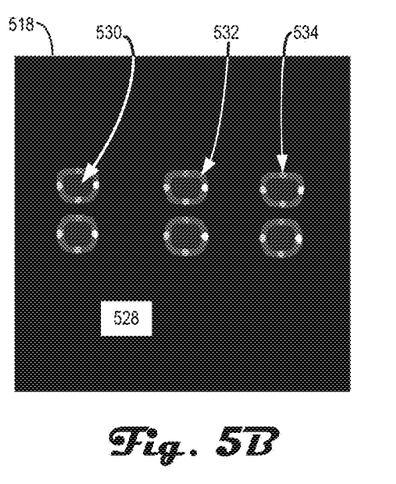

FIG. 5B is an example segmented image 518 in accordance with an embodiment of the present disclosure. The segmented image has had one or more classes assigned to each pixel of the input image 516. For example, a first class 530 has been assigned to pixels associated with the oval-ish shaped spot, a second class 532 has been assigned to pixels associated with dark ring surrounding the spot, a third class 534 has been assigned to key points of the structure, and a fourth class 528 assigned to the remaining pixels of the image 516. In some embodiments, all four classes may be overlaid on the input image 516 to aid metrology. In other embodiments, however, only one or two of the classes may be used to identify pixels of the input image 516 as key features for anchoring measurements of the features. In general, which class or classes to use may depend on the robustness of the segmentation and whether at least one of the classes are robust enough to assist placement of other metrology tools.

Figure 5C:
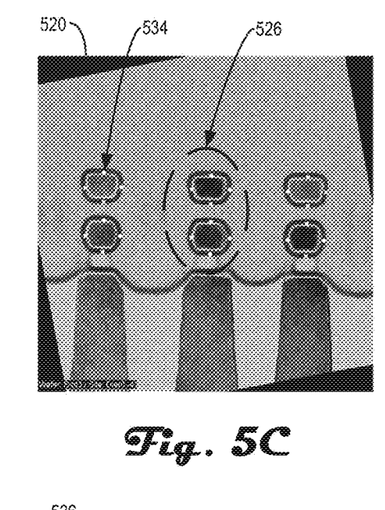

FIG. 5C is an example image 520 in accordance with an embodiment of the present disclosure. The image 520 is the input image 516 with the third class 534 overlaid thereon, or at least used to identify pixels in the original image to use as anchors/references for metrology purposes. The third class in this example includes the key points class of segmentation. The third class 534 locates the pixels in which reference features of the dark ring are located in the input image 516. For example, the third class 534 locates extrema of the dark ring on the top, bottom, left and right sides. These locations, as will be seen, are used as references for metrology purposes.

Figure 5D:
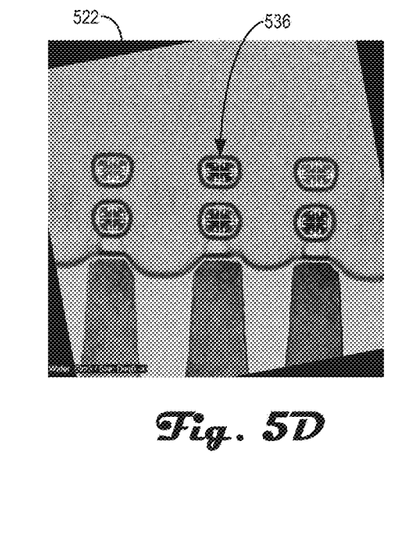
Figure 5E:
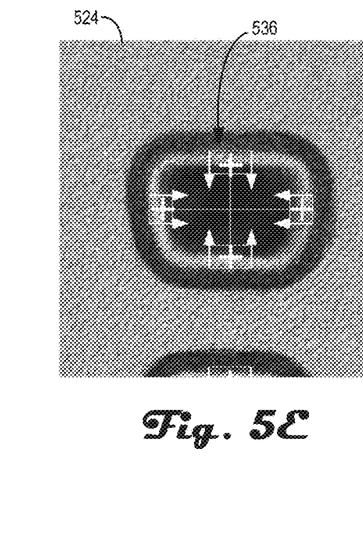

FIG. 5D is an example image 522 in accordance with an embodiment of the present disclosure. The image 522 includes the original input image 516 with edge finders 536 placed based on the key points class 534. The edge finders 536 begin with a virtual area formed on the image and centered on the pixels identified by the third class 534 locations. The edge finder algorithm then evaluates the image in the virtual area to determine an edge of the oval-ish shaped spots of the structures 526. While the third class 534 designates where the boundary likely is, the additional evaluation ensures the accuracy of the metrology. It should be noted, however, that if the segmentation is robust enough, then the segmentation may be the basis of the metrology instead of the additional edge finding analytics. However, the metrology may be performed on the original images, in most examples, based on the edge finding analytics. FIG. 5E is a close up image 524 of image 522, and shows in more detail the placement of the edge finders 536.

Once the edge finders are located and the edge finding algorithm is performed, metrology of the oval-ish shaped spots may be performed. For example, the distance between the left and right, top and bottom extrema of the oval-ish shaped spots may be determined.

The segmentation of the input image 516 by the neural network ensures efficient placement of the edge finders without having an operator to view each image to determine where the boundaries of the structure likely are. This may be especially true for misshapen structures or poor quality images that conventional image recognition algorithms may have trouble processing. While a single image may not provide much trouble for manual analysis, large numbers of image that require processing and measuring make the segmentation almost critical in the metrology of the images.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors or graphics processing units (GPUs) programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
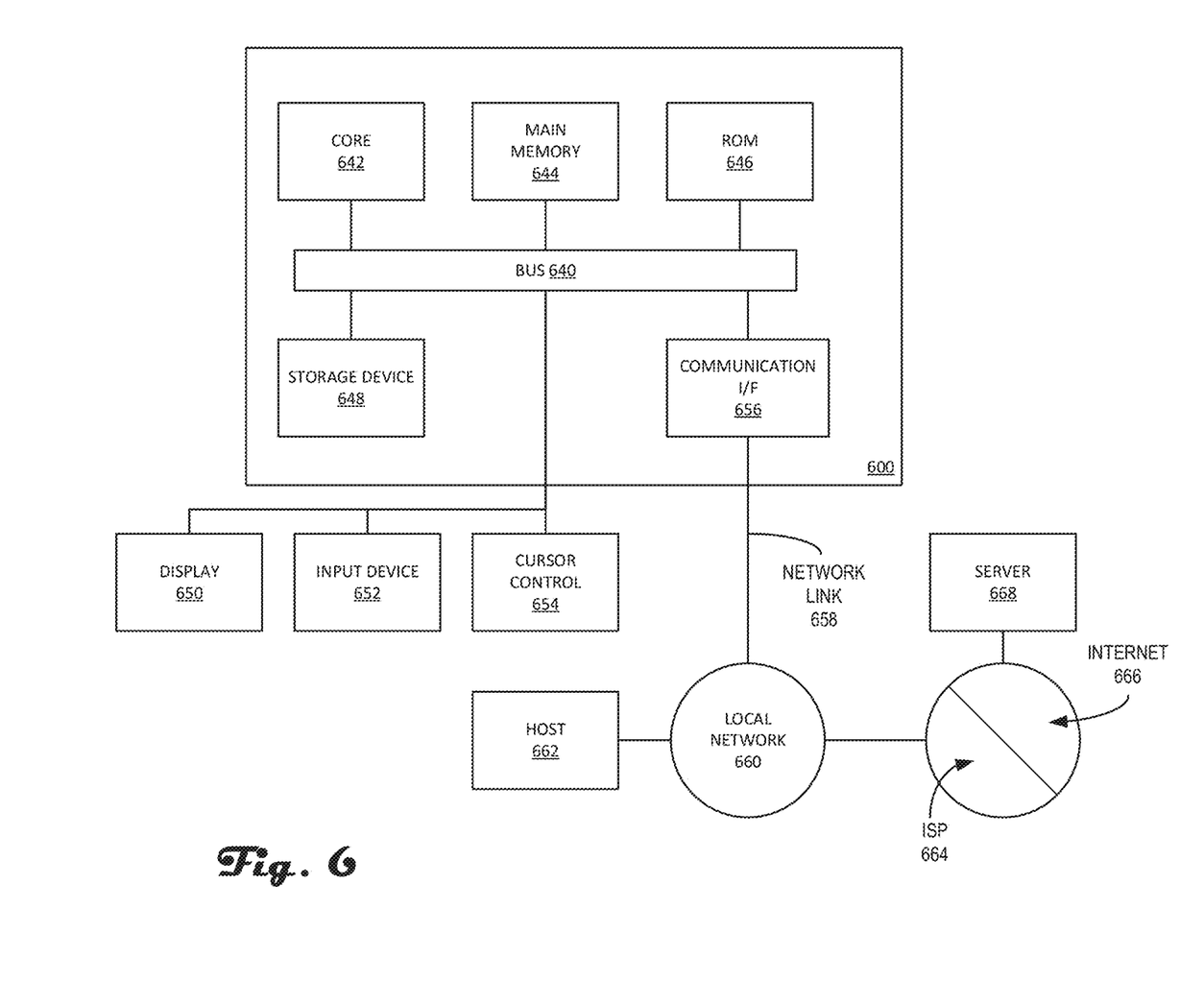
FIG. 6 is an example functional block diagram of a computing system 600 in accordance with an embodiment of the present disclosure.

For example, FIG. 6 is a block diagram that illustrates a computer system 600 upon which an embodiment of the invention may be implemented. The computing system 600 may be an example of the computing hardware included with CPM environment 102, such a controller 112, imaging platform 108, sample preparation platform 110, and/or servers 106. Additionally, computer system 600 may be used to implement the one or more neural networks disclosed herein, such as ANN 114 and/or CNNs 214A-D. Computer system 600 at least includes a bus 640 or other communication mechanism for communicating information, and a hardware processor 642 coupled with bus 640 for processing information. Hardware processor 642 may be, for example, a general purpose microprocessor. The computing system 600 may be used to implement the methods and techniques disclosed herein, such as methods 301 and 401, and may also be used to obtain images and segment said images with one or more classes.

Computer system 600 also includes a main memory 644, such as a random access memory (RAM) or other dynamic storage device, coupled to bus 640 for storing information and instructions to be executed by processor 642. Main memory 644 also may be used for storing temporary variables or other intermediate information during execution of instructions to be executed by processor 642. Such instructions, when stored in non-transitory storage media accessible to processor 642, render computer system 600 into a special-purpose machine that is customized to perform the operations specified in the instructions.

Computer system 600 further includes a read only memory (ROM) 646 or other static storage device coupled to bus 640 for storing static information and instructions for processor 642. A storage device 648, such as a magnetic disk or optical disk, is provided and coupled to bus 640 for storing information and instructions.

Computer system 600 may be coupled via bus 640 to a display 650, such as a cathode ray tube (CRT), for displaying information to a computer user. An input device 652, including alphanumeric and other keys, is coupled to bus 640 for communicating information and command selections to processor 642. Another type of user input device is cursor control 654, such as a mouse, a trackball, or cursor direction keys for communicating direction information and command selections to processor 642 and for controlling cursor movement on display 650. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 642 executing one or more sequences of one or more instructions contained in main memory 644. Such instructions may be read into main memory 644 from another storage medium, such as storage device 648. Execution of the sequences of instructions contained in main memory 644 causes processor 642 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 648. Volatile media includes dynamic memory, such as main memory 644. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 640. Transmission media can also take the form of acoustic or light waves, such as those generated during radio-wave and infra-red data communications.

Various forms of media may be involved in carrying one or more sequences of one or more instructions to processor 642 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 640. Bus 640 carries the data to main memory 644, from which processor 642 retrieves and executes the instructions. The instructions received by main memory 644 may optionally be stored on storage device 648 either before or after execution by processor 642.

Computer system 600 also includes a communication interface 656 coupled to bus 640. Communication interface 656 provides a two-way data communication coupling to a network link 658 that is connected to a local network 660. For example, communication interface 656 may be an integrated services digital network (ISDN) card, cable modem, satellite modem, or a modem to provide a data communication connection to a corresponding type of telephone line. As another example, communication interface 656 may be a local area network (LAN) card to provide a data communication connection to a compatible LAN. Wireless links may also be implemented. In any such implementation, communication interface 656 sends and receives electrical, electromagnetic or optical signals that carry digital data streams representing various types of information.

Network link 658 typically provides data communication through one or more networks to other data devices. For example, network link 658 may provide a connection through local network 660 to a host computer 662 or to data equipment operated by an Internet Service Provider (ISP) 664. ISP 664 in turn provides data communication services through the world wide packet data communication network now commonly referred to as the "Internet" 666. Local network 660 and Internet 666 both use electrical, electromagnetic or optical signals that carry digital data streams. The signals through the various networks and the signals on network link 658 and through communication interface 656, which carry the digital data to and from computer system 600, are example forms of transmission media.

Computer system 600 can send messages and receive data, including program code, through the network(s), network link 658 and communication interface 656. In the Internet example, a server 668 might transmit a requested code for an application program through Internet 666, ISP 664, local network 660 and communication interface 656.

The received code may be executed by processor 642 as it is received, and/or stored in storage device 648, or other non-volatile storage for later execution.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections. In addition, the values selected may be obtained by numerical or other approximate means and may only be an approximation to the theoretically correct/value.

What is claimed is:
1. A method comprising:
segmenting a first image of structure into one or more classes to form an at least partially segmented image, the one or more classes including a boundary class, the boundary class identifying a boundary of the structure, wherein segmenting the first image into one or more classes includes classifying each pixel of the first image as belonging to one or more classes of a plurality of classes;
identifying boundary pixels in a second image based on a classification of the boundary pixels into the boundary class;
forming a virtual area around the identified boundary pixels;
performing analysis including applying an edge finding algorithm at the virtual area to identify an edge of the structure; and
performing metrology on the second image based on the edge of the structure,
wherein classifying each pixel of the first image as belonging to one or more classes of a plurality of classes comprises:
classifying pixels of an input image into a key points class by a first convolutional neural network; and classifying pixels of the input image into a remainder of classes of the plurality of classes by a second convolutional neural network.

2. The method of claim 1, wherein the key points class designates key features of structure included in the second image.

3. The method of claim 1, wherein the plurality of classes comprises a structure body, and the key points, wherein the key points indicate key features of the structure for a basis of metrology.

4. The method of claim 1, wherein the edge finding algorithm performs boundary locating analytics at the virtual area.

5. The method of claim 1, wherein performing the analysis further comprises:
applying an active contour algorithm, or an image recognition algorithm at the virtual area to identify the edge of the structure.

6. The method of claim 1, wherein the first and second images are a same image.

7. The method of claim 1, wherein the first and second images are separate, registered images of the same structure.

8. A charged particle microscope system for performing metrology on obtained images, the system comprising:
an imaging platform to obtain one or more images of part of a sample, each of the one or more images including structure; and
a controller coupled to the imaging platform to at least perform metrology on the structure in at least one of the images, the controller, coupled to or including non-transitory, computer readable medium including code, that when executed by one or more cores, causes the controller to:
segment a first image of the one or more images of a structure into one or more classes to form a segmented image, the one or more classes including a boundary class, the boundary class identifying a boundary of the structure;
identify boundary pixels in a second image of the one or more images of the structure based on a classification of the boundary pixels into the boundary class;
forming a virtual area around the identified boundary pixels;
performing analysis including applying an edge finding algorithm at the virtual area to identify an edge of the structure; and
performing metrology on the second image based on the edge of the structure,
wherein the code, that when executed, causes the controller to segment the first image of structure into one or more classes further includes code that causes the controller to classify each pixel of the first image of the structure as belonging to one or more classes of a plurality of classes, and
wherein the code, that when executed, causes the controller to classify each pixel of the first image of the structure as belonging to one or more classes of a plurality of classes further includes code that, when executed, causes the controller to:
classify pixels of the first image of the structure into a key points class by a first convolutional neural network; and
classify pixels of the first image of the structure into a remainder of classes of the plurality of classes by a second convolutional neural network.

9. The system of claim 8, wherein the key points class designates key features of structure included in the first image.

10. The system of claim 8, wherein the plurality of classes comprises a structure body, and the key points, wherein the key points indicate key features of the structure for a basis of metrology.

11. The system of claim 8, wherein the code, when executed, causes the controller to apply the edge finding algorithm on the second image at the virtual area, and further includes code to analyze the second image of the structure inside the virtual area to determine the edge of the structure within the area.

12. The system of claim 11, wherein performing the metrology on the second image comprises:
using the edge of the structure to form an anchor point for measuring at least a portion of the structure, wherein the metrology is performed based on the anchor point.

13. The system of claim 8, wherein the first and second images are a same image.

14. The system of claim 8, wherein the first and second images are separate, registered images.

15. A method comprising:
providing a first image to a machine learning model to generate a second image, the second image being segmented into one or more classes by the machine learning model, wherein segmenting the first image into the one or more classes includes classifying each pixel of the first image as belonging to one or more classes of a plurality of classes, the one or more classes including a boundary class, the boundary class identifying pixels of the second image indicative of a boundary of a structure present in the second image to form a virtual area around the identified boundary pixels;
applying an edge finding algorithm to the virtual area to identify an edge of the structure; and
performing metrology operations on the second image using the identified edge as key features for anchoring measurements performed on the structure,
wherein classifying each pixel of the first image as belonging to one or more classes of a plurality of classes comprises:
classifying pixels of an input image into a key points class by a first convolutional neural network; and
classifying pixels of the input image into a remainder of classes of the plurality of classes by a second convolutional neural network.

* * * * *